US012658470B2

(12) United States Patent　　　　　　　　(10) Patent No.:　US 12,658,470 B2

Sakaida et al.　　　　　　　　　　　　　　　(45) Date of Patent:　　　Jun. 16, 2026

---

(54) SOLID ELECTROLYTE MATERIAL AND BATTERY USING SAME

(71) Applicant: Panasonic Intellectual Property Management Co., Ltd., Osaka (JP)

(72) Inventors: Masashi Sakaida, Hyogo (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 743 days.

(21) Appl. No.: 17/885,312

(22) Filed: Aug. 10, 2022

(65) Prior Publication Data

US 2022/0393233 A1　　　Dec. 8, 2022

Related U.S. Application Data

(63) Continuation of application No. PCT/JP2020/042338, filed on Nov. 12, 2020.

(30) Foreign Application Priority Data

Feb. 14, 2020　(JP) ................................. 2020-023807

(51) Int. Cl.
　　*H01M 10/0562*　　　(2010.01)
　　*H01M 10/0525*　　　(2010.01)

(52) U.S. Cl.
　　CPC ... *H01M 10/0562* (2013.01); *H01M 10/0525* (2013.01); *H01M 2300/008* (2013.01)

(58) Field of Classification Search
　　None
　　See application file for complete search history.

(56) References Cited

U.S. PATENT DOCUMENTS

| | | |
|---|---|---|
| 2012/0301796 A1 | 11/2012 | Ohtomo et al. |
| 2016/0013478 A1 | 1/2016 | Satow et al. |
| 2018/0159129 A1 | 6/2018 | Ide |

(Continued)

FOREIGN PATENT DOCUMENTS

| | | | | |
|---|---|---|---|---|
| CN | 103227326 A | * | 7/2013 | |
| EP | 3327837 A1 | * | 5/2018 | ........ H01M 10/0562 |

(Continued)

OTHER PUBLICATIONS

Machine English translation of JP-2013257992-A (Year: 2013).*

(Continued)

*Primary Examiner* — Ryan S Cannon
*Assistant Examiner* — Karen J. Armstrong
(74) *Attorney, Agent, or Firm* — Rimon P.C.

(57) ABSTRACT

A solid electrolyte material of the present disclosure includes Li, Zr, and F. A ratio of an amount of substance of Li to an amount of substance of Zr is less than 3.5. In an X-ray diffraction pattern obtained by an X-ray diffraction measurement of the solid electrolyte material using a Cu—Kα ray, a ratio of a value of a full width at half maximum of a peak having a highest intensity within a range of a diffraction angle 2θ from 27.5° to 29.5° to a value of a full width at half maximum of a peak corresponding to a (111) plane of Si in an X-ray diffraction pattern of Si measured under a same condition as in the X-ray diffraction measurement is more than 1.06.

5 Claims, 7 Drawing Sheets

(56) References Cited

U.S. PATENT DOCUMENTS

| 2022/0246983 A1 | 8/2022 | Suzuki et al. |
| 2022/0255125 A1 | 8/2022 | Suzuki et al. |

FOREIGN PATENT DOCUMENTS

| JP | 2008-258030 A | | 10/2008 |
| JP | 2011-129312 A | | 6/2011 |
| JP | 2013257992 A | * | 5/2013 |
| JP | 2018-092863 A | | 6/2018 |
| WO | 2021/024783 A1 | | 2/2021 |
| WO | 2021/024785 A1 | | 2/2021 |

OTHER PUBLICATIONS

Machine English translation of CN-103227326-A (Year: 2013).*
International Search Report issued on Jan. 26, 2021 in International
Patent Application No. PCT/JP2020/042338, with English translation.
Extended European Search Report dated Jun. 20, 2023 issued in the
corresponding European Patent Application No. 20918688.1.

* cited by examiner

SOLID ELECTROLYTE MATERIAL AND BATTERY USING SAME

This application is a continuation of PCT/JP2020/042338 filed on Nov. 12, 2020, which claims foreign priority of Japanese Patent Application No. 2020-023807 filed on Feb. 14, 2020, the entire contents of both of which are incorporated herein by reference.

BACKGROUND OF THE INVENTION

1. Field of the Invention

The present disclosure relates to a solid electrolyte material and a battery using the same.

2. Description of Related Art

JP 2011-129312 A discloses an all-solid-state battery using a sulfide solid electrolyte.

SUMMARY OF THE INVENTION

The present disclosure aims to provide a solid electrolyte material having a high lithium ion conductivity.

The solid electrolyte material of the present disclosure includes:

Li;

Zr, and

F, wherein a ratio of an amount of substance of Li to an amount of substance of Zr is less than 3.5, and in an X-ray diffraction pattern obtained by an X-ray diffraction measurement of the solid electrolyte material using a Cu—Kα ray, a ratio of a value of a full width at half maximum of a peak having a highest intensity within a range of a diffraction angle 2θ from 27.5° to 29.5° to a value of a full width at half maximum of a peak corresponding to a (111) plane of Si in an X-ray diffraction pattern of Si measured under a same condition as in the X-ray diffraction measurement is more than 1.06.

The present disclosure provides a solid electrolyte material having a high lithium ion conductivity.

DETAILED DESCRIPTION

Figure 1:
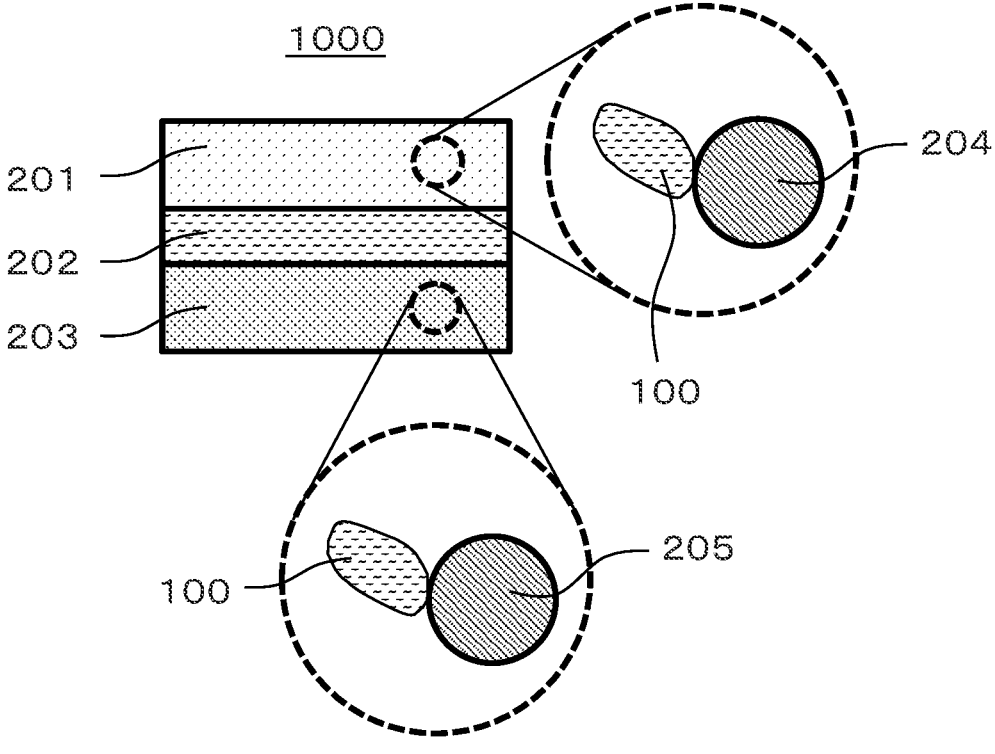
FIG. 1 illustrates a cross-sectional view of a battery 1000 according to a second embodiment.

Hereinafter, embodiments of the present disclosure will be described with reference to the drawings.

First Embodiment

A solid electrolyte material according to a first embodiment includes Li, Zr, and F. Here, the ratio of the amount of substance of Li to the amount of substance of Zr is less than 3.5. In an X-ray diffraction pattern obtained by an X-ray diffraction measurement of the solid electrolyte material according to the first embodiment using a Cu—Kα ray, the ratio of the value of the full width at half maximum of a peak having the highest intensity within the range of a diffraction angle 2θ from 27.5° to 29.5° to the value of the full width at half maximum of a peak corresponding to a (111) plane of Si in an X-ray diffraction pattern of Si measured under the same condition as in the X-ray diffraction measurement is more than 1.06. Hereinafter, in the X-ray diffraction pattern obtained by the X-ray diffraction measurement of the solid electrolyte material, the full width at half maximum of the peak having the highest intensity within the range of the diffraction angle 2θ from 27.5° to 29.5° is referred to as "FWHM". Furthermore, the full width at half maximum of the peak corresponding to the (111) plane of Si is referred to as "$FWHM_{Si}$". Here, a Si standard sample is used as Si which is measured under the same condition as in the X-ray diffraction measurement of the solid electrolyte material according to the first embodiment. As the Si standard sample, a standard Si powder available from NIST is for example used.

In the solid electrolyte material according to the first embodiment, satisfying the above condition "the ratio of FWHM to $FWHM_{Si}$ is more than 1.06" allows a resulting crystalline phase to have a nonuniform lattice constant. This generates a region where the crystal lattice is large in the solid electrolyte material according to the first embodiment, thereby facilitating conduction of lithium ions. Accordingly, the solid electrolyte material according to the first embodiment has a high lithium ion conductivity. Here, a high lithium ion conductivity is, for example, $2 \times 10^{-11}$ S/cm or more. In other words, the solid electrolyte material according to the first embodiment can have an ionic conductivity of, for example, $2 \times 10^{-11}$ S/cm or more.

The solid electrolyte material according to the first embodiment is specified not by the value of FWHM but by the ratio of FWHM to $FWHM_{Si}$. Accordingly, in specifying the solid electrolyte material according to the first embodiment, measurement errors caused by a measurement device do not need to be taken into consideration.

In the X-ray diffraction pattern of the solid electrolyte material according to the first embodiment, a peak having the highest intensity among single peaks is present within the range of the diffraction angle 2θ from 27.5° to 29.5°. Using such a peak allows to accurately evaluate the value of FWHM. Accordingly, the ratio of FWHM to $FWHM_{Si}$ can be accurately evaluated. Note that a single peak refers to a peak overlapping no other peak.

The solid electrolyte material according to the first embodiment can be used to achieve a battery having excellent charge and discharge characteristics. An example of the battery is an all-solid-state battery. The all-solid-state battery may be a primary battery or a secondary battery.

It is desirable that the solid electrolyte material according to the first embodiment should be substantially free of sulfur. The phrase "the solid electrolyte material according to the first embodiment is substantially free of sulfur" means that the solid electrolyte material does not contain sulfur as a constituent element except sulfur inevitably introduced as impurities. In this case, sulfur introduced as impurities into the solid electrolyte material has an amount of, for example, 1 mol % or less. From the viewpoint of safety, it is desirable that the solid electrolyte material according to the first embodiment should be free of sulfur. Solid electrolyte materials free of sulfur generate no hydrogen sulfide when exposed to the air, and accordingly are excellent in safety. The sulfide solid electrolyte disclosed in JP 2011-129312 A might generate hydrogen sulfide when exposed to the air.

Owing to containing F, the solid electrolyte material according to the first embodiment can have a high oxidation resistance. This is because F has a high oxidation-reduction potential.

The solid electrolyte material according to the first embodiment may consist substantially of Li, Zr, and F. Here, the phrase "the solid electrolyte material according to the first embodiment consists substantially of Li, Zr, and F" means that the molar ratio (i.e., mole fraction) of the sum of the amounts of substance of Li, Zr, and F to the total of the amounts of substance of all the elements constituting the solid electrolyte material according to the first embodiment is 90% or more. In an example, the molar ratio (i.e., mole fraction) may be 95% or more. The solid electrolyte material according to the first embodiment may consist of Li, Zr, and F.

The solid electrolyte material according to the first embodiment may contain an element which is inevitably introduced. Examples of the element include hydrogen, oxygen, and nitrogen. Such an element may be present in a raw material powder of the solid electrolyte material or in an atmosphere for manufacturing or storing the solid electrolyte material.

In a conversion pattern in which the horizontal axis of the X-ray diffraction pattern of the solid electrolyte material according to the first embodiment is converted from the diffraction angle 2θ to q, the ratio of the value of the full width at half maximum of a peak having the highest intensity within the range of q from 1.94 to 2.08 to the value of the full width at half maximum of a peak corresponding to a (111) plane of Si in a conversion pattern of Si measured under the same condition may be more than 1.06. Here, q satisfies a mathematical relation $q=4\pi \sin \theta/\lambda$. The symbol $\lambda$ represents the wavelength of an X-ray used for an X-ray diffraction measurement.

In other words, in the case where: in the above conversion pattern of the solid electrolyte material, the ratio of the value of the full width at half maximum of the peak having the highest intensity within the range of q from 1.94 to 2.08 to the value of the full width at half maximum of peak corresponding to the (111) plane of Si in the conversion pattern of Si measured under the same condition has a value more than 1.06; and the solid electrolyte material contains Li, Zr, and F, this solid electrolyte material can be regarded as a solid electrolyte material containing Li, Zr, and F and satisfying $FWHM/FWHM_{Si}>1.06$ Accordingly, for a solid electrolyte material containing Li, Zr, and F, measurement results obtained using a ray other than an X-ray (e.g., an electron ray) may be converted using a mathematical relation $q=4\pi \sin \theta/\lambda'$ ($\lambda'$ represents the wavelength of the ray) to obtain a conversion pattern. In the conversion pattern thus obtained, when satisfying the condition "the ratio of the value of the full width at half maximum of the peak having the highest intensity within the range of q from 1.94 to 2.08 to the value of the full width at half maximum of the peak corresponding to a (111) plane of Si in a conversion pattern of Si measured under the same condition is more than 1.06", the solid electrolyte material can be regarded as the solid electrolyte material according to the first embodiment.

In the solid electrolyte material according to the first embodiment, the ratio of FWHM to $FWHM_{Si}$ may be less than 5.0. This allows a crystalline structure having a high ionic conductivity to be maintained. To increase the ionic conductivity of the solid electrolyte material, the ratio of FWHM to $FWHM_{Si}$ may be 1.25 or more and 2.88 or less.

The solid electrolyte material according to the first embodiment may have a crystalline phase represented by the following composition formula (1).

$$Li_xZrF_{4+x} \qquad\qquad \text{Formula (1)}$$

In Formula (1), a mathematical relation $0<x<3.5$ is satisfied. A solid electrolyte material having such a crystalline phase has a high ionic conductivity.

In Formula (1), a mathematical relation $1.0\leq x\leq 3.0$ may be satisfied to increase the ionic conductivity of the solid electrolyte material.

The upper and lower limits of the range of x in Formula (1) can be defined by any combination selected from the numerical values of 1.0, 1.5, 1.8, 2.0, 2.2, 2.5, and 3.0.

The shape of the solid electrolyte material according to the first embodiment is not limited. The shape is, for example, acicular, spherical, or ellipsoidal. The solid electrolyte material according to the first embodiment may be in particle form. The solid electrolyte material according to the first embodiment may be formed in the shape of a pellet or a plate.

In the case where the shape of the solid electrolyte material according to the first embodiment is, for example, in particle form (e.g., spherical), the solid electrolyte material may have a median diameter of 0.1 μm or more and 100 μm or less. The median diameter means the particle diameter at a cumulative volume equal to 50% in the volumetric particle size distribution. The volumetric particle size distribution is measured, for example, by a laser diffraction measurement device or an image analysis device.

The solid electrolyte material according to the first embodiment may have a median diameter of 0.5 μm or more and 10 μm or less. This allows the solid electrolyte material to have a higher conductivity. Furthermore, in the case where the solid electrolyte material according to the first embodiment is mixed with other material such as an active material, a well-dispersed state of the solid electrolyte material according to the first embodiment and the other material is achieved.

<Method of Manufacturing Solid Electrolyte Material>

The solid electrolyte material according to the first embodiment is manufactured, for example, by the following method.

Raw material powders are prepared and mixed together so as to obtain a target composition. The raw material powders may be, for example, halide ones.

In an example, in the case where the target composition is $Li_3ZrF_7$, LiF and $ZrF_4$ are mixed together at a molar ratio of approximately 3.0:1.0. The raw material powders may be mixed together at a molar ratio adjusted in advance so as to cancel out a composition change which can occur in the synthesis process.

The raw material powders are reacted with each other mechanochemically (i.e., by a mechanochemical milling method) in a mixer such as a planetary ball mill to obtain a reaction product. The reaction product may be subjected to a heat treatment in a vacuum or in an inert atmosphere.

Alternatively, a mixture of the raw material powders may be subjected to a heat treatment in a vacuum or in an inert atmosphere. The heat treatment may be performed, for example, at 100° C. or more and 300° C. or less for 1 hour or more. To suppress a composition change in the heat treatment, the raw material powders or the reaction product may be subjected to a heat treatment in an airtight container such as a quartz tube.

Increasing the temperature or the time period of the heat treatment can reduce the value of FWHM of the resulting solid electrolyte material.

By these methods, the solid electrolyte material according to the first embodiment can be obtained.

The composition of the solid electrolyte material can be determined, for example, by ICP emission spectrometry, ion chromatography, an inert gas fusion-infrared absorption method, or an electron probe micro analyzer (EPMA) method. For example, the compositions of Li and Zr can be determined by ICP emission spectrometry whereas the composition of F can be determined by ion chromatography.

Second Embodiment

A second embodiment will be described below. The matters described in the first embodiment may be omitted.

A battery according to the second embodiment includes a positive electrode, a negative electrode, and an electrolyte layer. The electrolyte layer is provided between the positive electrode and the negative electrode. At least one selected from the group consisting of the positive electrode, the electrolyte layer, and the negative electrode includes the solid electrolyte material according to the first embodiment. Owing to including the solid electrolyte material according to the first embodiment, the battery according to the second embodiment has excellent charge and discharge characteristics. The battery may be an all-solid-state battery.

FIG. 1 illustrates a cross-sectional view of a battery 1000 according to the second embodiment.

The battery 1000 according to the second embodiment includes a positive electrode 201, an electrolyte layer 202, and a negative electrode 203. The electrolyte layer 202 is provided between the positive electrode 201 and the negative electrode 203.

The positive electrode 201 includes positive electrode active material particles 204 and solid electrolyte particles 100.

The electrolyte layer 202 includes an electrolyte material. The electrolyte material is, for example, a solid electrolyte material.

The negative electrode 203 includes negative electrode active material particles 205 and the solid electrolyte particles 100.

The solid electrolyte particles 100 are particles including the solid electrolyte material according to the first embodiment. The solid electrolyte particles 100 may be particles consisting of the solid electrolyte material according to the first embodiment or particles including the solid electrolyte material according to the first embodiment as a main component. Here, the particles including the solid electrolyte material according to the first embodiment as a main component refer to particles in which the component present in the largest amount in molar ratio is the solid electrolyte material according to the first embodiment.

The positive electrode 201 includes a material capable of occluding and releasing metal ions (e.g., lithium ions). The material is, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include Li(Ni, Co, Al)O$_2$, Li(Ni, Co, Mn)O$_2$, and LiCoO$_2$. In the present disclosure, the expression "(Ni, Co, Al)" in the chemical formula indicates at least one element selected from the group of elements in parentheses. In other words, the expression "(Ni, Co, Al)" is synonymous with the expression "at least one selected from the group consisting of Ni, Co, and Al". The same applies to other elements.

The positive electrode active material particles 204 may have a median diameter of 0.1 μm or more and 100 μm or less. In the case where the positive electrode active material particles 204 have a median diameter of 0.1 μm or more, a well-dispersed state of the positive electrode active material particles 204 and the solid electrolyte particles 100 is achieved in the positive electrode 201. This improves the charge and discharge characteristics of the battery. In the case where the positive electrode active material particles 204 have a median diameter of 100 μm or less, the diffusion rate of lithium in the positive electrode active material particles 204 improves. This allows the battery to operate at a high power.

The positive electrode active material particles 204 may have a median diameter larger than that of the solid electrolyte particles 100. This achieves a well-dispersed state of the positive electrode active material particles 204 and the solid electrolyte particles 100 in the positive electrode 201.

From the viewpoint of energy density and power output of the battery, in the positive electrode 201, the ratio of the volume of the positive electrode active material particles 204 to the total of the volume of the positive electrode active material particles 204 and the volume of the solid electrolyte particles 100 may be 0.30 or more and 0.95 or less.

On at least partially the surface of each of the positive electrode active material particles 204, a coating layer may be formed. The coating layer may be formed on the surface of each of the positive electrode active material particles 204, for example before mixture with a conductive additive and a binder. Examples of a coating material included in the coating layer include a sulfide solid electrolyte, an oxide solid electrolyte, and a halide solid electrolyte. In the case where the solid electrolyte particles 100 include a sulfide solid electrolyte, the coating material may include the solid electrolyte material according to the first embodiment to suppress an oxidative decomposition of the sulfide solid electrolyte. In the case where the solid electrolyte particles 100 include the solid electrolyte material according to the first embodiment, the coating material may include an oxide solid electrolyte to suppress an oxidative decomposition of the solid electrolyte material. As the oxide solid electrolyte, lithium niobate having an excellent high-potential stability may be used. By suppressing the oxidative decomposition, it is possible to suppress an increase in overvoltage of the battery.

From the viewpoint of energy density and power output of the battery, the positive electrode 201 may have a thickness of 10 μm or more and 500 μm or less.

The electrolyte layer 202 includes an electrolyte material. The electrolyte material is, for example, a solid electrolyte material. The electrolyte layer 202 may be a solid electrolyte layer.

The electrolyte layer 202 may include the solid electrolyte material according to the first embodiment. The electrolyte layer 202 may consist of the solid electrolyte material according to the first embodiment. The electrolyte layer 202 may consist of a solid electrolyte material different from the solid electrolyte material according to the first embodiment. Examples of the solid electrolyte material different from the solid electrolyte material according to the first embodiment include $Li_2MgX_4$, $Li_2FeX_4$, $Li(Al, Ga, In)X_4$, $Li_3(Al, Ga, In)X_6$, and LiI, where X is at least one selected from the group consisting of F, Cl, Br, and I.

Hereinafter, the solid electrolyte material according to the first embodiment is referred to as a first solid electrolyte material. The solid electrolyte material different from the solid electrolyte material according to the first embodiment is referred to as a second solid electrolyte material.

The electrolyte layer 202 may include not only the first solid electrolyte material but also the second solid electrolyte material. The first solid electrolyte material and the second solid electrolyte material may be homogeneously dispersed in the electrolyte layer 202. A layer consisting of the first solid electrolyte material and a layer consisting of the second solid electrolyte material may be stacked together in a stacking direction of the battery 1000.

Figure 2:
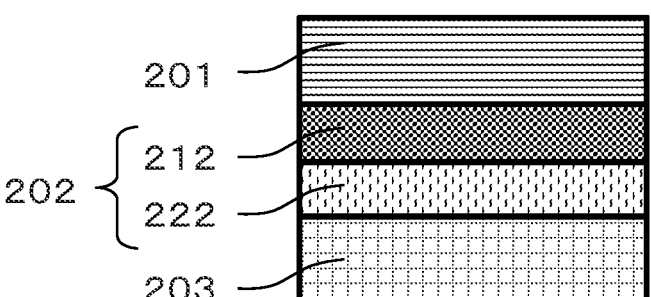
FIG. 2 illustrates a cross-sectional view of a battery 2000 according to the second embodiment.

FIG. 2 illustrates a cross-sectional view of a battery 2000 according to the second embodiment.

As illustrated in FIG. 2, the battery 2000 may include the positive electrode 201, a first electrolyte layer 212, a second electrolyte layer 222, and the negative electrode 203. In other words, the electrolyte layer 202 may include the first electrolyte layer 212 and the second electrolyte layer 222. The first electrolyte layer 212 is disposed between the positive electrode 201 and the negative electrode 203. The second electrolyte layer 222 is disposed between the first electrolyte layer 212 and the negative electrode 203.

In the battery 2000, the first electrolyte layer 212 may include the solid electrolyte material according to the first embodiment. Since the solid electrolyte material according to the first embodiment has a high oxidation resistance, the solid electrolyte material included in the second electrolyte layer 222 can be used without being oxidized. Consequently, the charge and discharge efficiency of the battery can be improved.

In the battery 2000, the solid electrolyte material included in the second electrolyte layer 222 may have a reduction potential lower than that of the solid electrolyte material included in the first electrolyte layer 212. Accordingly, the solid electrolyte material included in the first electrolyte layer 212 can be used without being reduced. Consequently, the charge and discharge efficiency of the battery can be improved. For example, in the case where the first electrolyte layer 212 includes the solid electrolyte material according to the first embodiment, the second electrolyte layer 222 may include a sulfide solid electrolyte to suppress a reductive decomposition of the solid electrolyte material.

From the viewpoint of energy density and power output of the battery, the electrolyte layer 202 may have a thickness of 1 μm or more and 1000 μm or less.

The negative electrode 203 includes a material capable of occluding and releasing metal ions (e.g., lithium ions). The material is, for example, a negative electrode active material (e.g., the negative electrode active material particles 205).

Examples of the negative electrode active material include a metal material, a carbon material, an oxide, a nitride, a tin compound, and a silicon compound. The metal material may be an elemental metal or an alloy. Examples of the metal material include lithium metal and a lithium alloy. Examples of the carbon material include a natural graphite, a coke, a semi-graphitized carbon, a carbon fiber, a spherical carbon, an artificial graphite, and an amorphous carbon. From the viewpoint of capacity density, preferred examples of the negative electrode active material include silicon (i.e., Si), tin (i.e., Sn), a silicon compound, and a tin compound.

The negative electrode active material may be selected in consideration of the reduction resistance of the solid electrolyte material included in the negative electrode 203. For example, in the case where the negative electrode 203 includes the solid electrolyte material according to the first embodiment, the negative electrode active material may be a material capable of occluding and releasing lithium ions at 0.27 V or more with respect to lithium. Examples of such a negative electrode active material include a titanium oxide, indium metal, and a lithium alloy. Examples of the titanium oxide include $Li_4Ti_5O_{12}$, $LiTi_2O_4$, and $TiO_2$. By using the above negative electrode active material, it is possible to suppress a reductive decomposition of the solid electrolyte material according to the first embodiment included in the negative electrode 203. Consequently, the charge and discharge efficiency of the battery can be improved.

The negative electrode active material particles 205 may have a median diameter of 0.1 μm or more and 100 μm or less. In the case where the negative electrode active material particles 205 have a median diameter of 0.1 μm or more, a well-dispersed state of the negative electrode active material particles 205 and the solid electrolyte particles 100 is achieved in the negative electrode 203. This improves the charge and discharge characteristics of the battery. In the case where the negative electrode active material particles 205 have a median diameter of 100 μm or less, the diffusion rate of lithium in the negative electrode active material particles 205 improves. This allows the battery to operate at a high power.

The negative electrode active material particles 205 may have a median diameter larger than that of the solid electrolyte particles 100. This achieves a well-dispersed state of the negative electrode active material particles 205 and the solid electrolyte particles 100 in the negative electrode 203.

From the viewpoint of energy density and power output of the battery, in the negative electrode 203, the ratio of the volume of the negative electrode active material particles 205 to the total of the volume of the negative electrode active material particles 205 and the volume of the solid electrolyte particles 100 may be 0.30 or more and 0.95 or less.

From the viewpoint of energy density and power output of the battery, the negative electrode 203 may have a thickness of 10 μm or more and 500 μm or less. To increase the ionic conductivity, the chemical stability, and the electrochemical stability, at least one selected from the group consisting of the positive electrode 201, the electrolyte layer 202, and the negative electrode 203 may include the second solid electrolyte material. Examples of the second solid electrolyte material include a sulfide solid electrolyte, an oxide solid electrolyte, a halide solid electrolyte, and an organic polymer solid electrolyte.

In the present disclosure, the term "sulfide solid electrolyte" means a solid electrolyte containing sulfur. The term "oxide solid electrolyte" means a solid electrolyte containing oxygen. The oxide solid electrolyte may contain an anion other than oxygen (excluding sulfur anions and halogen anions). The term "halide solid electrolyte" means a solid electrolyte containing a halogen element and being free of sulfur. The halide solid electrolyte may contain not only a halogen element but also oxygen.

The second solid electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

In the case where the electrolyte layer 202 includes the solid electrolyte material according to the first embodiment, the negative electrode 203 may include a sulfide solid electrolyte to suppress a reductive decomposition of the solid electrolyte material. By covering the negative electrode active material with the sulfide solid electrolyte which is electrochemically stable, it is possible to suppress a contact of the solid electrolyte material according to the first embodiment with the negative electrode active material. Consequently, the internal resistance of the battery can be reduced.

The second solid electrolyte material may be an oxide solid electrolyte.

Examples of the oxide solid electrolyte include:
(i) a NASICON solid electrolyte such as $LiTi_2(PO_4)_3$ and element-substituted substances thereof;
(ii) a perovskite solid electrolyte such as $(LaLi)TiO_3$;
(iii) a LISICON solid electrolyte such as $Li_{14}ZnGe_4O_{16}$, $Li_4SiO_4$, and $LiGeO_4$ and element-substituted substances thereof;
(iv) a garnet solid electrolyte such as $Li_7La_3Zr_2O_{12}$ and element-substituted substances thereof; and
(v) $Li_3PO_4$ and N-substituted substances thereof.

As described above, the second solid electrolyte material may be a halide solid electrolyte.

Examples of the halide solid electrolyte include $Li_2MgX_4$, $Li_2FeX_4$, $Li(Al, Ga, In)X_4$, $Li_3(Al, Ga, In)X_6$, and LiI, where X is at least one selected from the group consisting of F, Cl, Br, and I.

Another example of the halide solid electrolyte material is a compound represented by $Li_aMe_bY_cX_6$, where $a+mb+3c=6$ and $c>0$ are satisfied. Me is at least one selected from the group consisting of metal elements other than Li and Y and metalloid elements. The symbol m represents the valence of Me. The "metalloid elements" are B, Si, Ge, As, Sb, and Te. The "metal elements" are: all the elements included in Groups 1 to 12 of the periodic table (excluding hydrogen); and all the elements included in Groups 13 to 16 of the periodic table (excluding B, Si, Ge, As, Sb, Te, C, N, P, O, S, and Se).

To increase the ionic conductivity of the halide solid electrolyte material, Me may be at least one selected from the group consisting of Mg, Ca, Sr, Ba, Zn, Sc, Al, Ga, Bi, Zr, Hf, Ti, Sn, Ta, and Nb. The halide solid electrolyte may be $Li_3YCl_6$ or $Li_3YBr_6$.

The second solid electrolyte material may be an organic polymer solid electrolyte.

An example of the organic polymer solid electrolyte is a compound of a polymer compound with a lithium salt.

The polymer compound may have an ethylene oxide structure. A polymer compound having an ethylene oxide structure can contain a large amount of a lithium salt, and accordingly can further increase the ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_6)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

To facilitate transfer of lithium ions and thereby improve the output characteristics of the battery, at least one selected from the group consisting of the positive electrode 201, the electrolyte layer 202, and the negative electrode 203 may include a nonaqueous electrolyte solution, a gel electrolyte, or an ionic liquid.

The nonaqueous electrolyte solution contains a nonaqueous solvent and a lithium salt dissolved in the nonaqueous solvent.

Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a combination of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_6)_2$, $LiN(SO_2CF_3)(SO_2C_4F_3)$, and $LiC(SO_2CF_3)_3$. One lithium salt selected from these may be used alone. Alternatively, a mixture of two or more lithium salts selected from these may be used. The concentration of the lithium salt falls, for example, within a range from 0.5 mol/L to 2 mol/L.

As the gel electrolyte, a polymer material impregnated with a nonaqueous electrolyte solution can be used. Examples of the polymer material include polyethylene oxide, polyacrylonitrile, polyvinylidene fluoride, polymethyl methacrylate, and a polymer having an ethylene oxide bond.

Examples of cations contained in the ionic liquid include:
(i) aliphatic linear quaternary salts such as tetraalkylammoniums and tetraalkylphosphoniums;
(ii) aliphatic cyclic ammoniums such as pyrrolidiniums, morpholiniums, imidazoliniums, tetrahydropyrimidiniums, piperaziniums, and piperidiniums; and
(iii) nitrogen-containing heterocyclic aromatic cations such as pyridiniums and imidazoliums.

Examples of anions contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

To improve the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. A copolymer can also be used as the binder. Examples of such a binder include a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more materials selected from these may be used as the binder.

At least one of the positive electrode 201 and the negative electrode 203 may contain a conductive additive to reduce the electron resistance.

Examples of the conductive additive include:

(i) graphites such as a natural graphite and an artificial graphite;

(ii) carbon blacks such as acetylene black and ketjen black;

(iii) conductive fibers such as a carbon fiber and metal fiber;

(iv) fluorinated carbon;

(v) metal powders such as an aluminum powder;

(vi) conductive whiskers such as a zinc oxide whisker and a potassium titanate whisker;

(vii) a conductive metal oxide such as titanium oxide; and (viii) a conductive polymer compound such as polyaniline compound, polypyrrole compound, and polythiophene compound. To reduce the cost, the conductive additive in (i) or (ii) above may be used.

Examples of the shape of the battery according to the second embodiment include a coin type, a cylindrical type, a prismatic type, a sheet type, a button type, a flat type, and a stack type.

The battery according to the second embodiment may be manufactured, for example, by preparing a material for forming a positive electrode, a material for forming an electrolyte layer, and a material for forming a negative electrode, and producing by a known method a stack in which the positive electrode, the electrolyte layer, and the negative electrode are disposed in this order.

EXAMPLES

Hereinafter, the present disclosure will be described in more detail with reference to examples and a comparative example.

Example 1

(Production of Solid Electrolyte Material)

In an argon atmosphere with a dew point of −60° C. or lower (hereinafter referred to as "dry argon atmosphere"), LiF and $ZrF_4$ were prepared as raw material powders at a molar ratio of $LiF:ZrF_4=3.0:1.0$. These raw material powders were pulverized for mixing in a mortar. The resulting mixed powder was subjected to a milling process with a planetary ball mill at 500 rpm for 12 hours. Thus, a powder of the solid electrolyte material according to Example 1 was obtained. The solid electrolyte material according to Example 1 had a composition represented by $Li_3ZrF_7$.

(Evaluation of Full Width at Half Maximum)

Figure 3:
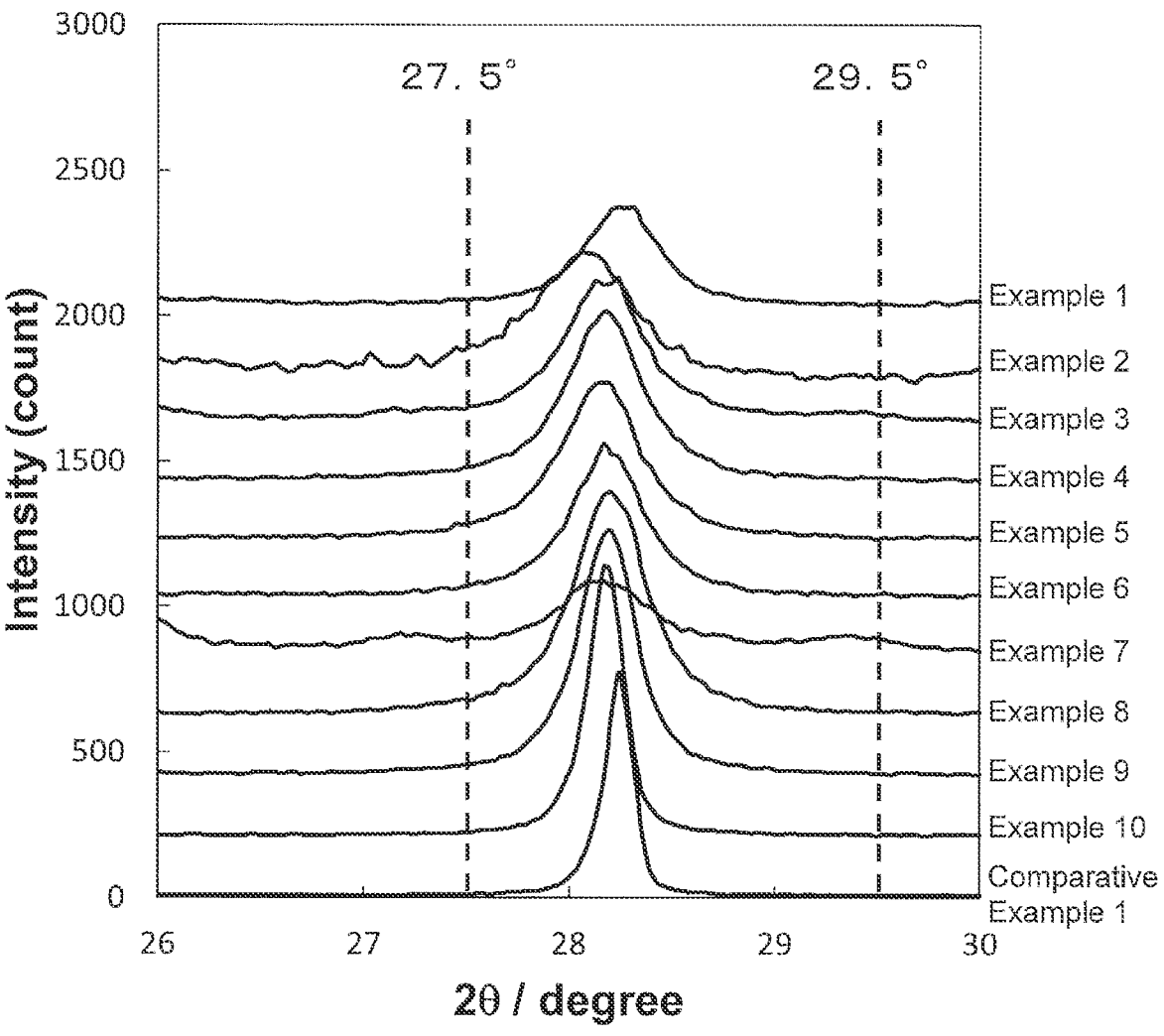
FIG. 3 is a graph showing X-ray diffraction patterns of solid electrolyte materials according to Examples 1 to 10 and Comparative Example 1.

FIG. 3 is a graph showing an X-ray diffraction pattern of the solid electrolyte material according to Example 1.

In a dry environment with a dew point of −50° C. or less, the X-ray diffraction pattern of the solid electrolyte material according to Example 1 was measured using an X-ray diffraction apparatus (MiniFlex 600 available from Rigaku Corporation). The measurement was performed by the θ-2θ method using Cu—Kα rays (wavelengths of 1.5405 Å and 1.5444 Å) as X-ray sources. The measuring angle interval was set to 0.01°. The divergence angle of the divergence slit was set to 0.25°. The slit width of the length-limiting slit was set to 5 mm.

The value of the diffraction angle 2θ of a peak having the highest intensity within the range of the diffraction angle 2θ from 27.5° to 29.5° was defined as $2θ_{top}$, and the intensity of the peak was defined as $I_{top}$. The intensity at the diffraction angle 2θ of 29.5° was defined as $I_{bg}$. In other words, $I_{bg}$ represents the baseline intensity. The half value $I_{htop}$ of $I_{top}$ was defined as $[(I_{top}−I_{bg})/2+I_{bg}]$.

The diffraction angle 2θ at which the intensity closest to the $I_{htop}$ is exhibited within the range of the diffraction angle 2θ from 27.5° to $2θ_{top}$ is defined as $2θ_L$. The diffraction angle 2θ at which the intensity closest to the $I_{htop}$ is exhibited within the range from $2θ_{top}$ to 29.5° is defined as $2θ_H$. FWHM is the difference between $2θ_H$ and $2θ_L$. FWHM of the solid electrolyte material according to Example 1 was 0.42 deg.

Next, an X-ray diffraction measurement was performed for a Si crystal powder under the similar conditions to those of the solid electrolyte material according to Example 1. The value of the diffraction angle 2θ of a peak having the highest intensity within the range of the diffraction angle 2θ from 28.0° to 28.6° was defined as $2θ_{top}$, and the intensity of the peak was defined as $I_{top}$. The intensity at the diffraction angle 2θ of 28.0° was defined as $I_{bg}$. As a result, $FWHM_{Si}$ of the Si crystal powder was 0.16 deg. The Si crystal powder used was a Si standard sample "SRM 640d (NIST)".

(Conversion of Horizontal Axis of X-Ray Diffraction Pattern)

Figure 4:
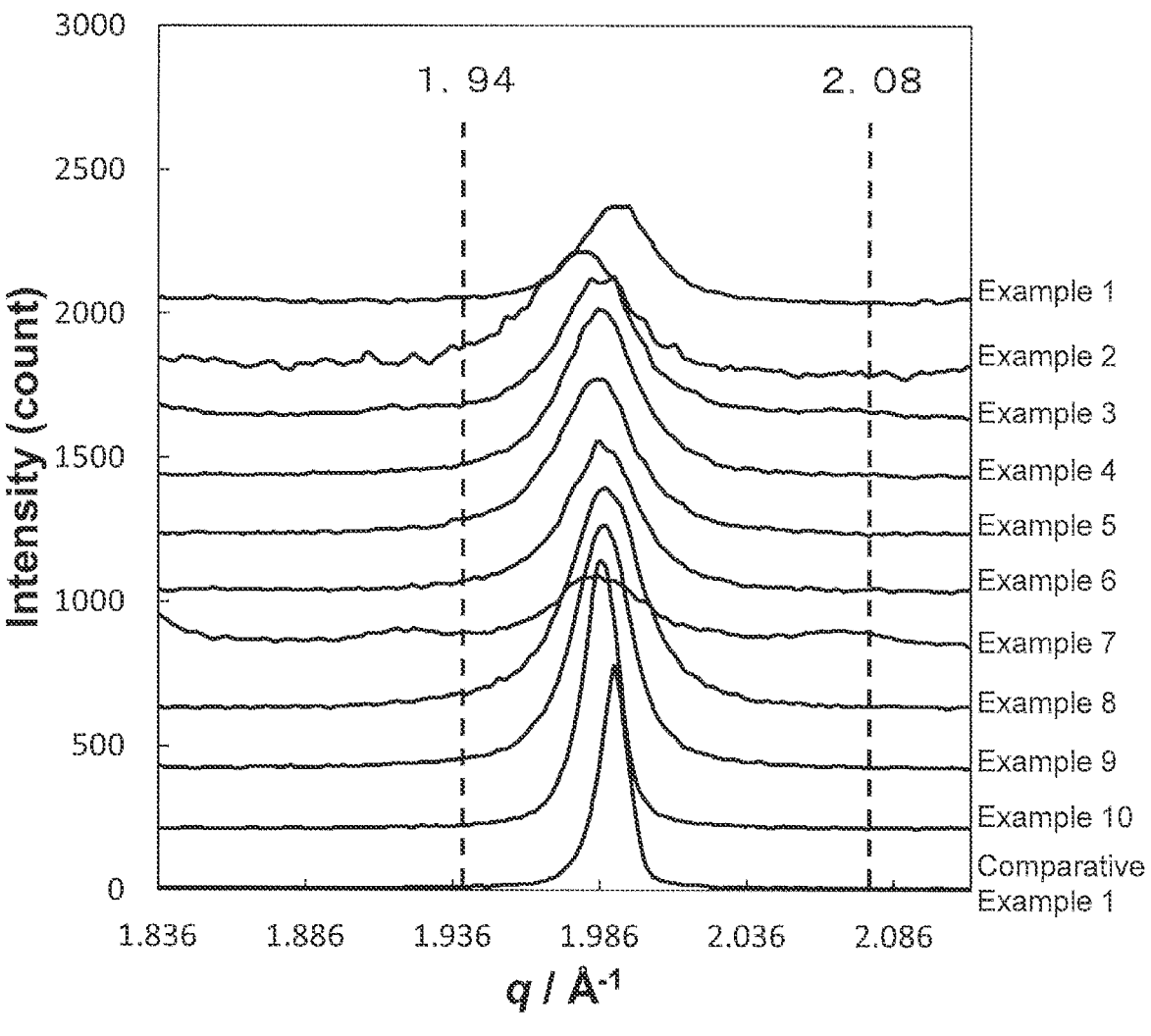
FIG. 4 is a graph showing a conversion pattern of the solid electrolyte material according to Example 1 obtained by converting the horizontal axis of the graph in FIG. 3 from 2θ to q.

The horizontal axis of the X-ray diffraction pattern of the solid electrolyte material according to Example 1 shown in FIG. 3 was converted from the diffraction angle 2θ to q, where $q=4π \sin θ/λ$ is satisfied, and λ is the wavelength of the X-ray used for the X-ray diffraction measurement. Thus, a conversion pattern of the solid electrolyte material according to Example 1 was obtained. FIG. 4 is a graph showing the conversion pattern of the solid electrolyte material according to Example 1 obtained by converting the horizontal axis of the graph in FIG. 3 from 2θ to q.

(Evaluation of Ionic Conductivity)

Figure 5:
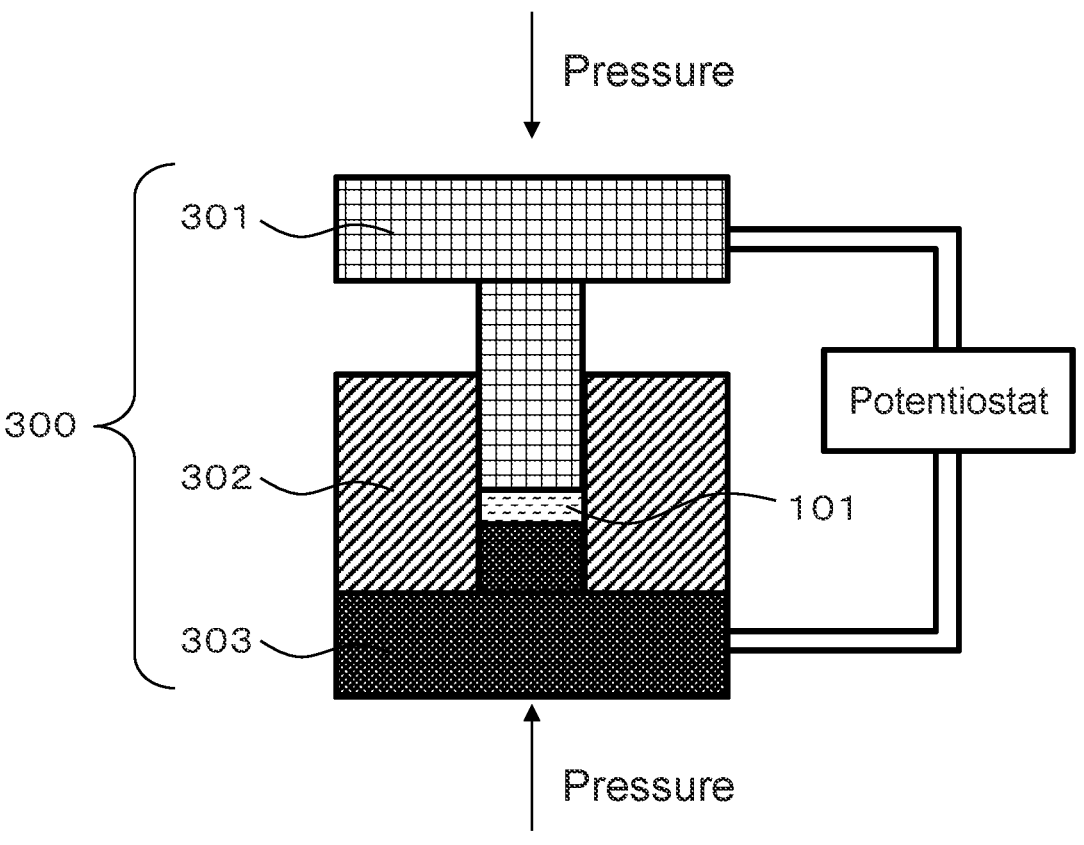
FIG. 5 illustrates a schematic view of a pressure-molding die 300 used to evaluate the ionic conductivity of solid electrolyte materials.

FIG. 5 illustrates a schematic view of a pressure-molding die 300 used to evaluate the ionic conductivity of solid electrolyte materials.

The pressure-molding die 300 included an upper punch 301, a die 302, and a lower punch 303. The die 302 was formed of insulating polycarbonate. The upper punch 301 and the lower punch 303 were formed of electronically conductive stainless steel.

The pressure-molding die 300 illustrated in FIG. 5 was used to evaluate the ionic conductivity of the solid electrolyte material according to Example 1 by the following method.

In a dry atmosphere with a dew point of −30° C. or less, the powder of the solid electrolyte material according to Example 1 was charged into the pressure-molding die 300. Inside the pressure-molding die 300, a pressure of 400 MPa was applied to the solid electrolyte material according to Example 1 with the upper punch 301 and the lower punch 303.

While the pressure was being applied, the upper punch 301 and the lower punch 303 were connected to a potentiostat (VersaSTAT 4 available from Princeton Applied Research Corporation) equipped with a frequency response analyzer. The upper punch 301 was connected to a working electrode and a potential measurement terminal. The lower punch 303 was connected to a counter electrode and a reference electrode. The impedance of the solid electrolyte material was measured at room temperature by electro-chemical impedance measurement.

Figure 6:
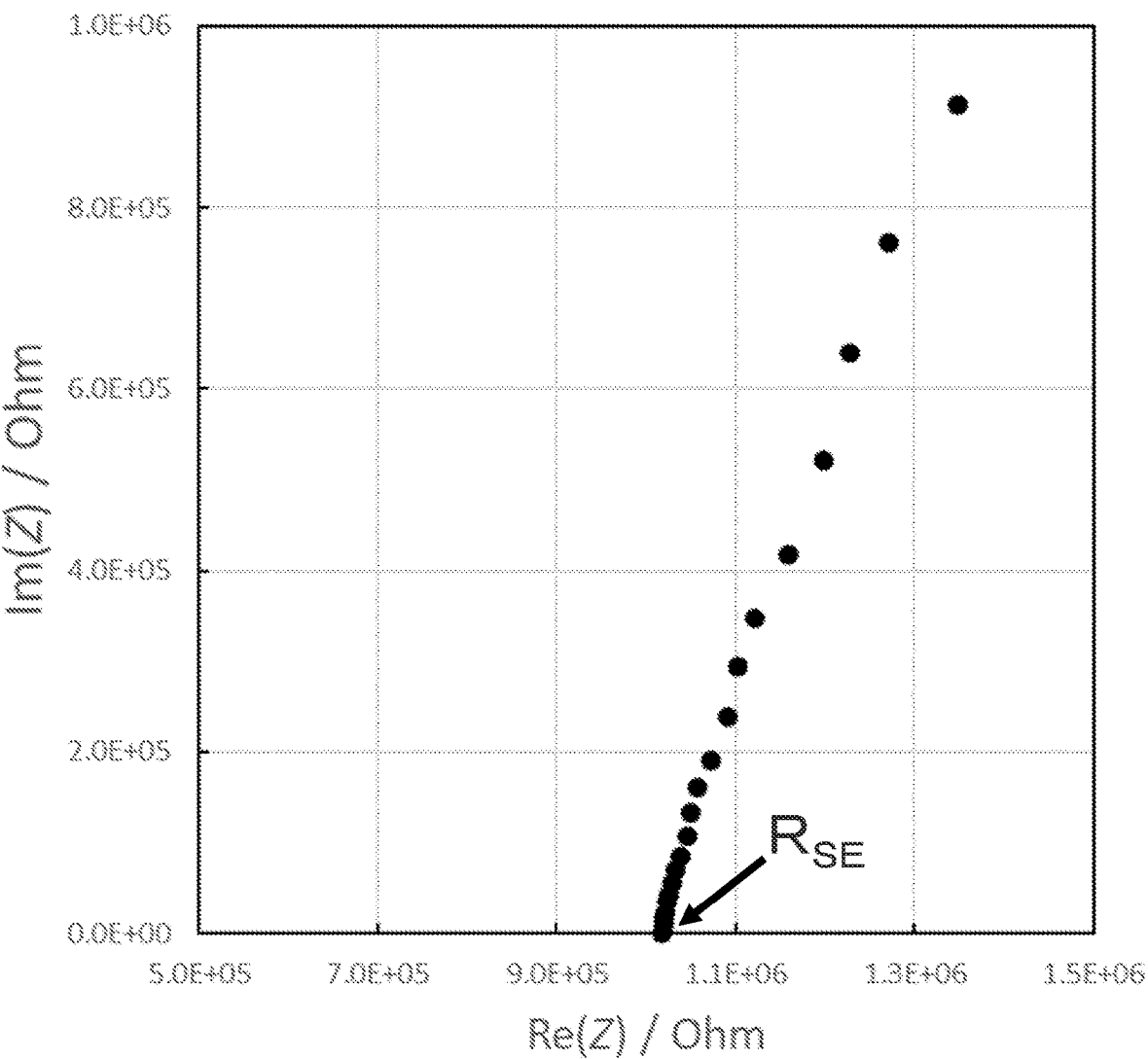
FIG. 6 is a graph showing a Cole-Cole plot obtained by an impedance measurement for a solid electrolyte material according to Example 1.

FIG. 6 is a graph showing a Cole-Cole plot obtained by an impedance measurement for the solid electrolyte material according to Example 1.

In FIG. 6, the real part of the complex impedance at the measurement point where the absolute value of the phase of the complex impedance was smallest was assumed to be the resistance value of the solid electrolyte material to ion conduction. For the real part, see an arrow $R_{SE}$ shown in FIG. 6. The resistance value was used to calculate the ionic conductivity based on the following mathematical formula (2).

$$\sigma = \left(R_{SE} \times S/t\right)^{-1} \quad (2)$$

Here, $\sigma$ represents the ionic conductivity. The symbol S represents the contact area of the solid electrolyte material with the upper punch 301 (which is equal to the cross-sectional area of the cavity of the die 302 in FIG. 5). The symbol $R_{SE}$ represents the resistance value of the solid electrolyte material in the impedance measurement. The symbol t represents the thickness of the solid electrolyte material (i.e., the thickness of a layer formed from a solid electrolyte material powder 101 in FIG. 5).

The ionic conductivity of the solid electrolyte material according to Example 1 measured at 25° C. was $6.19 \times 10^{-8}$ S/cm.

(Production of Battery)

In a dry argon atmosphere, the solid electrolyte material according to Example 1 and $LiCoO_2$, which is an active material, were prepared at a volume ratio of 30:70. These materials were mixed together in an agate mortar. Thus, a positive electrode mixture was obtained.

Next, LiCl and $YCl_3$ were prepared at a molar ratio of $LiCl:YCl_3=3:1$. These materials were pulverized for mixing in a mortar. The resulting mixture was subjected to a milling process with a planetary ball mill at 500 rpm for 12 hours. Thus, a halide solid electrolyte having a composition represented by $Li_3YCl_6$ (hereinafter referred to as "LYC") was obtained.

In an insulating cylinder having an inner diameter of 9.5 mm, LYC (70 mg), the solid electrolyte material according to Example 1 (33 mg), and the positive electrode mixture described above (9.1 mg) were stacked in this order. A pressure of 300 MPa was applied to the obtained stack to form a second electrolyte layer formed of LYC, a first electrolyte layer formed of the solid electrolyte material according to Example 1, and a positive electrode. In other words, the first electrolyte layer formed of the solid electrolyte material according to Example 1, was sandwiched between the second electrolyte layer and the positive electrode. The second electrolyte layer had a thickness of 450 μm, and the first electrolyte layer had a thickness of 150 μm.

Next, metal In (thickness: 200 μm) was stacked on the second electrolyte layer. A pressure of 80 MPa was applied to the obtained stack to form a negative electrode.

Next, current collectors formed of stainless steel were attached to the positive electrode and the negative electrode, and current collector leads were attached to the current collectors.

Finally, an insulating ferrule was used to isolate the interior of the insulating cylinder from the outside air atmosphere, thereby sealing the interior of the cylinder. Thus, a battery according to Example 1 was obtained.

(Charge and Discharge Test)

Figure 7:
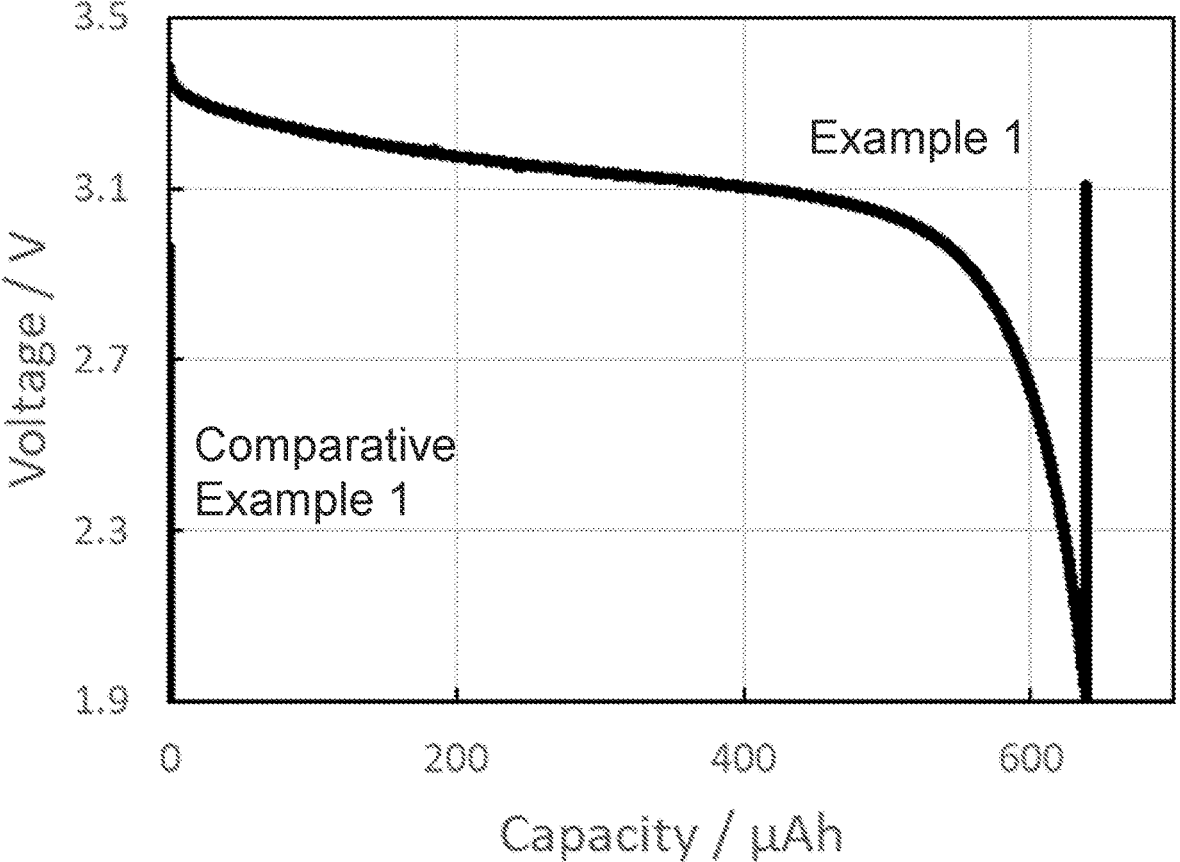
FIG. 7 is a graph showing the initial discharge characteristics of batteries according to Example 1 and Comparative Example 1.

FIG. 7 is a graph showing the initial discharge characteristics of the battery according to Example 1. The initial discharge characteristics were measured by the following method.

The battery according to Example 1 was placed in a thermostatic chamber at 85° C.

The battery according to Example 1 was charged to a voltage of 3.6 V at a current density of 27 μA/cm². The current density corresponds to 0.02-C rate.

Next, the battery according to Example 1 was discharged to a voltage of 1.9 V at a current density of 27 μA/cm².

As a result of the charge and discharge test, the battery according to Example 1 had an initial discharge capacity of 639 μAh.

Examples 2 to 10

(Production of Solid Electrolyte Materials)

In Examples 2 to 7, LiF and $ZrF_4$ were prepared as raw material powders at a molar ratio of $LiF:ZrF_4=x:1$. The processes except for the above were performed in a similar manner to those in Example 1 to obtain solid electrolyte materials according to Examples 2 to 7. The values of x are shown in Table 1.

In Examples 8 to 10, LiF and $ZrF_4$ were prepared as raw material powders at a molar ratio of $LiF:ZrF_4=x:1$. The raw material mixed powder was subjected to a milling process and then to a heat treatment for 1 hour. The processes except for the above were performed in a similar manner to those in Example 1 to obtain solid electrolyte materials according to Examples 8 to 10.

The values of x in Examples 2 to 10 and the temperatures for the heat treatment in Examples 8 to 10 are shown in Table 1. In Table 1, "BM" indicates a milling process with a planetary ball mill.

(Evaluation of Full Width at Half Maximum)

FWHM of the solid electrolyte materials according to Examples 2 to 10 was calculated as in Example 1. The values of FWHM and $FWHM/FWHM_{Si}$ are shown in Table 1.

(Evaluation of Ionic Conductivity)

The ionic conductivity of the solid electrolyte materials according to Examples 2 to 10 was measured as in Example 1. The measurement results are shown in Table 1.

(Production of Batteries)

The similar processes to those in Example 1 were performed using the solid electrolyte materials according to Examples 2 to 10 to obtain batteries according to Examples 2 to 10.

(Charge and Discharge Test) The batteries according to Examples 2 to 10 were subjected to a charge and discharge test as in Example 1. The batteries according to Examples 2 to 10 were favorably charged and discharged as in Example 1.

Comparative Example 1

In a dry argon atmosphere, LiF and $ZrF_4$ were prepared as raw material powders at a ratio of $LiF:ZrF_4=2:1$. The raw material powders were mixed together in a mortar, and then were formed into pellets. The resulting pellet mixed powder was subjected to a heat treatment at 450° C. for 5 hours. Thus, a powder of the solid electrolyte material according to Comparative Example 1 was obtained.

FWHM of the solid electrolyte material according to Comparative Example 1 was calculated as in Example 1. The results are shown in Table 1.

The ionic conductivity of the solid electrolyte material according to Comparative Example 1 was measured as in Example 1. The results are shown in Table 1.

The similar processes to those in Example 1 were performed using the solid electrolyte material according to Comparative Example 1 to obtain a battery according to Comparative Example 1. The battery of Comparative Example 1 was subjected to a charge and discharge test as in Example 1. As a result, the battery of Comparative Example 1 had an initial discharge capacity of 0.01 μAh or less. In other words, the battery of Comparative Example 1 was not charged or discharged.

measurement of the solid electrolyte material using a Cu—Kα ray, a ratio of a value of a full width at half maximum of a peak having a highest intensity within a range of a diffraction angle $2\theta$ from 27.5° to 29.5° to a value of a full width at half maximum of a peak corresponding to a (111) plane of Si in an X-ray diffraction pattern of Si measured under a same condition as in the X-ray diffraction measurement is 2.44 or more, where a Si standard sample is used as Si which is measured under the same condition as in the X-ray diffraction measurement of the solid electrolyte material, and, as the Si standard sample being a standard Si powder available from NIST "SRM 640d (NIST)".

TABLE 1

|  | Composition | x | Synthetic method | Heat treatment temperature | FWHM [deg] | FWHM/ FWHM$_{Si}$ | Ionic conductivity [S/cm] |
|---|---|---|---|---|---|---|---|
| Example 1 | Li$_3$ZrF$_7$ | 3 | BM | — | 0.42 | 2.63 | $6.19 \times 10^{-8}$ |
| Example 2 | Li$_2$ZrF$_6$ | 2 | BM | — | 0.41 | 2.56 | $4.54 \times 10^{-9}$ |
| Example 3 | Li$_{1.5}$ZrF$_{5.5}$ | 1.5 | BM | — | 0.44 | 2.75 | $4.22 \times 10^{-9}$ |
| Example 4 | Li$_{1.8}$ZrF$_{5.8}$ | 1.8 | BM | — | 0.42 | 2.62 | $4.57 \times 10^{-9}$ |
| Example 5 | Li$_{2.2}$ZrF$_{6.2}$ | 2.2 | BM | — | 0.45 | 2.81 | $3.43 \times 10^{-8}$ |
| Example 6 | Li$_{2.5}$ZrF$_{6.5}$ | 2.5 | BM | — | 0.39 | 2.44 | $5.03 \times 10^{-8}$ |
| Example 7 | LiZrF$_5$ | 1 | BM | — | 0.46 | 2.88 | $8.54 \times 10^{-9}$ |
| Example 8 | Li$_2$ZrF$_6$ | 2 | BM→ Heat treatment | 100° C. | 0.41 | 2.56 | $9.85 \times 10^{-10}$ |
| Example 9 | Li$_2$ZrF$_6$ | 2 | BM→ Heat treatment | 200° C. | 0.33 | 2.06 | $5.37 \times 10^{-11}$ |
| Example 10 | Li$_2$ZrF$_6$ | 2 | BM→ Heat treatment | 300° C. | 0.2 | 1.25 | $2.78 \times 10^{-10}$ |
| Comparative Example 1 | Li$_2$ZrF$_6$ | 2 | Heat treatment | 450° C. | 0.17 | 1.06 | $1.04 \times 10^{-11}$ |

<Discussion>

The solid electrolyte materials according to Examples 1 to 10 each had a high ionic conductivity of $2 \times 10^{-11}$ S/cm or more at room temperature.

The batteries according to Examples 1 to 10 were all charged and discharged at 85° C. In contrast, the battery according to Comparative Example 1 was not charged or discharged.

The solid electrolyte materials according to Examples 1 to 10 are free of sulfur, and accordingly generate no hydrogen sulfide.

As discussed above, the solid electrolyte material according to the present disclosure has a high lithium ion conductivity, and is suitable for providing a battery that can be favorably charged and discharged.

INDUSTRIAL APPLICABILITY

The solid electrolyte material of the present disclosure is used, for example, in all-solid-state lithium ion secondary batteries.

What is claimed is:

1. A solid electrolyte material comprising:
Li;
Zr; and
F, wherein:
a ratio of an amount of substance of Li to an amount of substance of Zr is less than 3.5, and in an X-ray diffraction pattern obtained by an X-ray diffraction 2. The solid electrolyte material according to claim 1, comprising a crystalline phase represented by the following composition formula (1), $$Li_x ZrF_{4+x} \qquad \text{Formula (1)}$$

where a mathematical relation 0<x<3.5 is satisfied.

3. The solid electrolyte material according to claim 2, wherein
a mathematical relation 1.0≤x≤3.0 is satisfied.

4. A battery comprising:
a positive electrode;
a negative electrode; and
an electrolyte layer provided between the positive electrode and the negative electrode, wherein
at least one selected from the group consisting of the positive electrode, the negative electrode, and the electrolyte layer includes the solid electrolyte material according to claim 1.

5. The battery according to claim 4, wherein
the electrolyte layer includes a first electrolyte layer and a second electrolyte layer,
the first electrolyte layer is disposed between the positive electrode and the negative electrode,
the second electrolyte layer is disposed between the first electrolyte layer and the negative electrode, and
the first electrolyte layer includes the solid electrolyte material.

* * * * *